United States Patent [19]

Le

[11] Patent Number: 4,972,700

[45] Date of Patent: Nov. 27, 1990

[54] FUEL LEAK SENSOR SYSTEM

[75] Inventor: Phong Q. Le, Santa Ana, Calif.

[73] Assignee: The United States of America as represented by the Secretary of the Air Force, Washington, D.C.

[21] Appl. No.: 451,896

[22] Filed: Dec. 18, 1989

[51] Int. Cl.$^5$ .............................................. G01M 3/26
[52] U.S. Cl. .......................................... 73/40; 73/49.2
[58] Field of Search ..................... 73/40, 40.5 R, 49.1, 73/49.5, 49.2

[56] References Cited

U.S. PATENT DOCUMENTS

| | | | |
|---|---|---|---|
| 2,041,450 | 5/1936 | Adams | 73/40 |
| 4,256,403 | 3/1981 | Powell | 356/73 |
| 4,784,959 | 11/1988 | Wegrzyn | 436/3 |

FOREIGN PATENT DOCUMENTS 6433 1/1983 Japan ..................... 73/49.2

*Primary Examiner*—Hezron E. Williams
*Assistant Examiner*—Joseph W. Roskos
*Attorney, Agent, or Firm*—Irwin P. Garfinkle; Donald J. Singer

[57] ABSTRACT

A fuel leak detector for an aircraft system is shown as comprising a plurality of potential fuel leak sources where leaking fules are routed to a collector through a leak detector associated only with only one of the potential leak sources and the fule leak collector. Each detector permits the flow of leaking fuel into the collector, while at the same time maintaining a visual or other type of indication of the location of the fuel leak. Each detector comprises a small, light weight container which traps up to a predetermined amount of any fluid flowing through it. The level of the trapped fluid is indicated by a float. Fluid in excess of the predetermined amount flows through the container trap and into the collector. The contents of the collector are tested for fuel, and if fuel is detected, the maintenance personnel then search the individual traps for a visual indication of the location of the fuel leak.

1 Claim, 1 Drawing Sheet

FUEL LEAK SENSOR SYSTEM

STATEMENT OF GOVERNMENT INTEREST

The invention described herein may be manufactured and used by or for the Government for governmental purposes without the payment of any royalty thereon.

BACKGROUND OF THE INVENTION

Prior art fuel leak sensor systems are used in connection with many complex aircraft. Generally such systems comprise an installation of many fuel sensor lines which are routed from various potential fuel leak sources to a common collector. Push-to-test drain valves or similar devices located in the collector are used to determine the presence of fuel. Once the presence of fuel in the collector is detected, maintenance personnel are then required to examine each potential associated fuel leak source to determine which one or ones are responsible for the fuel detected in the collector. If the leak is very slow, and visually undetectable, all of the sense lines are individually capped with plastic bags or other collector containers. Such a system traps the leaking fuel at the particular fuel sensor line associated with the source of the leak, and provides a positive identification of the source of the leak.

The prior art system of determining the source of a leak in an aircraft is effective, but is very time consuming and labor intensive. The present invention is an improvement over the prior art in that it incorporates a visual sensor between the potential fuel leak source and the collector. The visual sensor serves as a collector trap at each potential leak source, and therefore permits rapid identification of the source of any leak.

SUMMARY OF THE INVENTION

The present invention is an improvement over the prior art in that it provides a fuel leak indicator between each of the potential leak sources and the fuel leak collector. Each detector permits the flow of leaking fuel into the collector, while at the same time maintaining a visual or other type of indication of the location of the fuel leak. Each detector comprises a small, light weight container which traps up to a predetermined amount of any fluid flowing through it. In the embodiment illustrated, the level of the trapped fluid is indicated by a float. Fluid in excess of the predetermined amount flows through the container trap and into the collector. As in the prior art, the contents of the collector are tested for fuel, and if fuel is detected, the maintenance personnel then search the individual traps for a visual indication of the location of the fuel leak.

DETAILED DESCRIPTION OF THE PREFERRED EMBODIMENT

Figure 1:
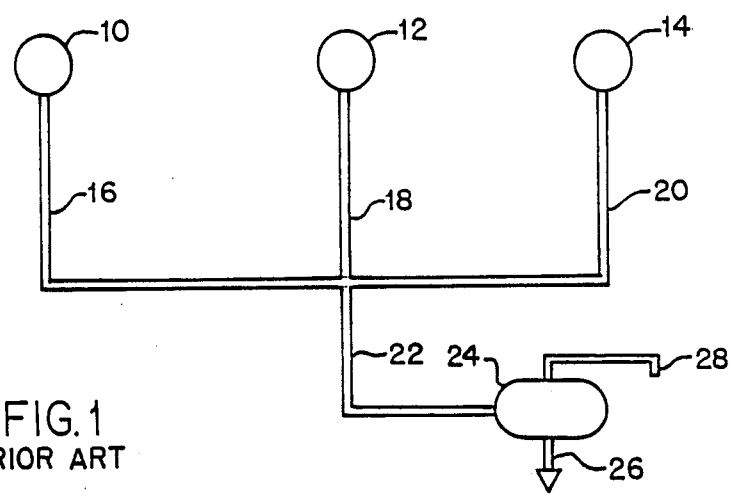
FIG. 1 is a schematic representation of a prior art fuel leak detector system.

FIG. 1 illustrates the prior art fuel leak detector system over which the present invention is an improvement. Potential leak sources are shown schematically as elements 10, 12 and 14. While only three of such sources are shown, it will be understood that the system contemplates a much larger number, and that these elements will comprise such components as shrouded fuel couplings, fuel cells, valves, pumps and any other similar component which may be subject to a possible fuel leak. The leakage, if any, from the elements 10 to 14 is routed through fuel leak lines 16, 18, 20 and 22 to a fuel leak collector 24.

Leakage from any one or all of the potential leak sources 10 to 14 accumulates in the collector 24 where the presence of fuel can be detected. In the illustrated prior art system, the presence of fuel is detected by depressing a push-to-test valve 26. If fuel drains from the valve 26, the maintenance personnel know that there is a leak somewhere in the system. If the collector 24 overfills it is drained overboard through a drain 28.

Figure 2:
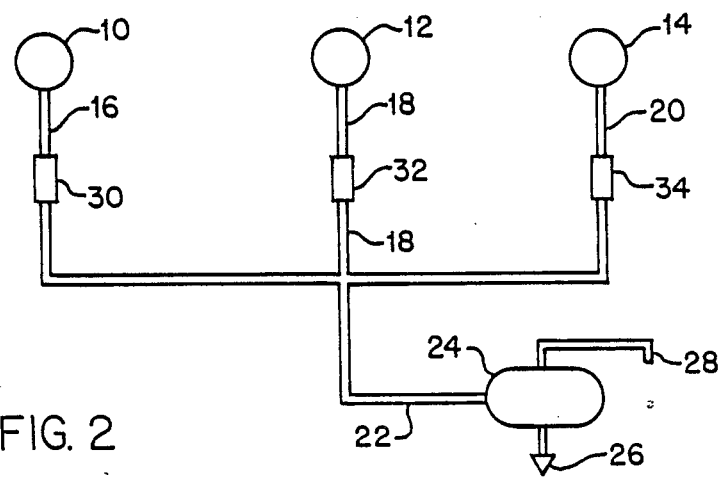
FIG. 2 is a schematic representation of the prior art fuel leak detector system modified in accordance with this invention.

In the prior art system described in FIG. 1, once a leak is detected by the presence of fuel within the collector 24, maintenance personnel are then required to find the leak by checking each potential leak source. As previously noted, this task can be tedious, time consuming, costly and labor intensive, since the leak can be in any one of many locations. In accordance with this invention, and as illustrated in FIG. 2, the procedure for finding the leak source is simplified by providing detectors 30, 32 and 34, respectively, between each of the sources 10, 12, and 14, and the single collector 24.

Figure 3:
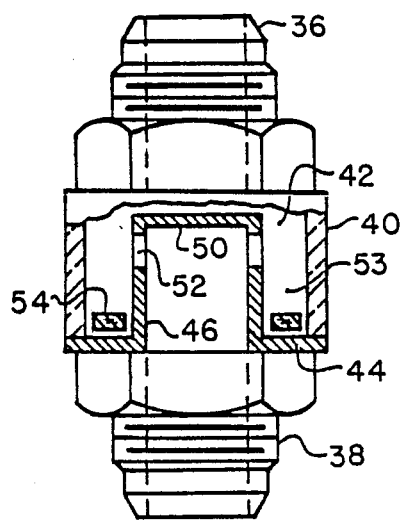
FIG. 3 illustrates a preferred detector used in accordance with this invention.

The detectors 30, 32 and 34 are identical and the construction is shown in FIG. 3. Each detector comprises a small lightweight container which can trap a small, predetermined amount of any fluid flowing through it. The lines 16, 18 and 20 are cut and threaded and each of the detectors has a threaded inlet end 36 and a threaded outlet end 38 which are threaded into the lines. The central part of the detector comprises a conduit formed by a transparent cylindrical wall 40. In the use of the detector, the axis of the wall 40 is vertically oriented, so that the conduit has an upper inlet end 42 which is open to receive any fuel leaking from its associated fuel leak source. The wall 40 is closed at its lower end by an annular disc 44 from which an inner cylinder 46 projects. The upper end of the cylinder 46 is closed by a wall 50. Holes 52, located at a predetermined height above the bottom of the chamber, are provided in the cylinder 46. Thus, the volume between the inner and outer cylinders 40 and 46 and below the holes 52 provides an annular fluid trap 53 for any fuel leaking into the detector. Any fuel in excess of the volume of the trap 53 overflows through the holes 52 and flows by gravity into the collector 24.

An annular float 54 is positioned within the annular trap 53, and provides a visual indication of the presence and the level of leaking fuel.

THE OPERATION OF THE SYSTEM

In operation, the collector 24 is monitored manually on a regular basis to determine if a leak exists anywhere in the system. In systems presently being used this is handled manually by maintenance personnel. It is well within the scope of this invention to provide an automatic system for monitoring the collector 24. Manually, the collector is monitored by simply pushing the push-to-test valve at the collector. If fuel flows out, a leak is known to exist somewhere. The location of the leak is then determined by inspecting each of the individual detectors, where the existence of a leak can be established by the position of the float 54.

While one exemplary embodiment of the invention has been illustrated, it will be recognized that this invention is subject to various modifications and adaptations. For example, the indications of leaks both at the detectors and at the collector may be automated. Moreover, the configuration of the trap may be modified, provided that provisions are made for trapping a sufficient amount of fuel to provide an appropriate indication. It is intended therefore that this invention be limited only in accordance with the following claims as interpreted in the light of the prior art.

What is claimed is:

1. In a fuel leak detection system having a relatively large number of potential fuel leak sources, the combination comprising:

a fuel collector, said collector having means for determining the presence of fuel therein;

fuel sensor lines, said fuel sensor lines connecting said fuel leak sources to said collector; and a fuel detector in each of said fuel sensor lines, each detector comprising a conduit for conducting fuel from a respective source to said collector, said conduit having trap means for trapping a predetermined quantity of fuel in said conduit, said trap means comprising a transparent cylindrical chamber into which said fuel from said source flows, the bottom of said chamber being closed by a disc, an inner cylinder projecting upward from said disc, said cylinder communicating at its lower end with a sensor line through a central opening in said disc, the upper end of said inner cylinder having an opening at a predetermined height above said disc, whereby the fluid above said height in said chamber flows into said inner cylinder and to said sensor line; and a float in said chamber indicating the presence of fuel therein by the position of said float in said chamber, the position of said float being visually detectable through said transparent cylindrical chamber.

* * * * *